(12) United States Patent
Romas et al.

(10) Patent No.: US 9,099,876 B1
(45) Date of Patent: Aug. 4, 2015

(54) IN-SITU, AUTOMATED ORIENTATION OF ENERGY STORAGE CELLS

(71) Applicant: Lockheed Martin Corporation, Grand Prairie, TX (US)

(72) Inventors: Gregory G Romas, Coppell, TX (US); Jacob M Stultz, Grapevine, TX (US); Thomas E Byrd, Grand Prairie, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 476 days.

(21) Appl. No.: 13/673,583

(22) Filed: Nov. 9, 2012

Related U.S. Application Data

(60) Provisional application No. 61/559,492, filed on Nov. 14, 2011, provisional application No. 61/558,938, filed on Nov. 11, 2011, provisional application No. 61/558,925, filed on Nov. 11, 2011.

(51) Int. Cl.
*H02J 7/00* (2006.01)
*H01H 9/30* (2006.01)

(52) U.S. Cl.
CPC .................................. *H02J 7/0034* (2013.01)

(58) Field of Classification Search
USPC .......................................................... 307/138
See application file for complete search history.

(56) References Cited

U.S. PATENT DOCUMENTS

| | | | |
|---|---|---|---|
| 4,144,483 A | 3/1979 | Thornley |
| 4,361,795 A | 11/1982 | Santilli |
| 5,541,495 A | 7/1996 | Gali |
| 5,612,859 A | 3/1997 | Kakalec et al. |
| 5,666,281 A | 9/1997 | Mandelcorn |
| 6,130,519 A | 10/2000 | Whiting et al. |

*Primary Examiner* — Robert Deberadinis
(74) *Attorney, Agent, or Firm* — Withrow & Terranova, PLLC

(57) ABSTRACT

An energy storage cell, or a plurality of energy storage cells assembled into an apparatus, are self-orienting relative to one or more adjacent energy storage cells. The energy storage cells are capable of sensing their polarity orientation of at least one other energy storage cell and self-orienting its own polarity responsive thereto. Thus, a method for self-orienting a subject energy storage cell includes: sensing the polarity of an adjacent energy storage cell; and setting the polarity of the subject energy storage cell responsive to the sensed polarity if the polarities of the adjacent energy storage cell and the subject energy storage cell are incompatible.

22 Claims, 2 Drawing Sheets

IN-SITU, AUTOMATED ORIENTATION OF ENERGY STORAGE CELLS

CROSS-REFERENCE TO RELATED APPLICATIONS

The priority of U.S. Provisional Application 61/558,925 entitled, "In-Situ, Automated Orientation of Energy Storage Cells", filed Nov. 11, 2011, in the name of the inventors Gregory G. Romas, et al., and commonly assigned herewith, is hereby claimed pursuant to 35 U.S.C. §119(e). This application is also hereby incorporated by reference for all purposes as if set forth verbatim herein.

The priority of U.S. Provisional Application 61/558,938 entitled, "In-Situ, Automated Orientation of Energy Storage Cells", filed Nov. 11, 2011, in the name of the inventors Gregory G. Romas, et al., and commonly assigned herewith, is hereby claimed pursuant to 35 U.S.C. §119(e). This application is also hereby incorporated by reference for all purposes as if set forth verbatim herein.

The priority of U.S. Provisional Application 61/559,492 entitled, "In-Situ, Automated Orientation of Energy Storage Cells", filed Nov. 14, 2011, in the name of the inventors Gregory G. Romas, et al., and commonly assigned herewith, is hereby claimed pursuant to 35 §119(e). This application is also hereby incorporated by reference for all purposes as if set forth verbatim herein.

STATEMENT REGARDING FEDERALLY SPONSORED RESEARCH OR DEVELOPMENT

Not applicable.

BACKGROUND

This section introduces information that may be related to or provide context for some aspects of the technique described herein and/or claimed below. This information is background facilitating a better understanding of that which is disclosed herein. This is a discussion of "related" art. That such art is related in no way implies that it is also "prior" art. The related art may or may not be prior art. The discussion is to be read in this light, and not as admissions of prior art.

When utilizing battery cells, the user must insert the cell in the correct orientation in order for the output voltage to be utilized properly. This presents a difficulty in some circumstances. For example, soldiers operating in low light and high stress conditions are not in a position to devote much attention and effort toward getting the battery cells properly oriented.

The presently disclosed technique is directed to resolving, or at least reducing, one or all of the problems mentioned above. Even if solutions are available to the art to address these issues, the art is always receptive to improvements or alternative means, methods and configurations. Thus, there exists and need for technique such as that disclosed herein.

SUMMARY

In a first aspect, an energy storage cell, comprising: an energy cell; means for sensing is the polarity orientation of an adjacent energy storage cell; and means for self-orienting the energy storage cell's polarity responsive to the sensed polarity of the adjacent energy storage cell.

In a second aspect, an energy storage cell, comprising: an energy cell; sensing circuit capable of sensing the polarity orientation of an adjacent energy storage cell; and a polarity control circuit capable of self-orienting the polarity responsive to the sensed polarity.

In a third aspect, an apparatus comprising: a plurality of energy storage cells, each energy storage cell capable of sensing the polarity orientation of at least one other energy storage cell and self-orienting its polarity responsive thereto.

In a fourth aspect, a method for self-orienting a subject energy storage cell, comprising: sensing the polarity of an adjacent energy storage cell; and setting the polarity of the subject energy storage cell responsive to the sensed polarity if the polarities of the adjacent energy storage cell and the subject energy storage cell are incompatible.

The above paragraph presents a simplified summary of the presently disclosed subject matter in order to provide a basic understanding of some aspects thereof. The summary is not an exhaustive overview, nor is it intended to identify key or critical elements to delineate the scope of the subject matter claimed below. Its sole purpose is to present some concepts in a simplified form as a prelude to the more detailed description set forth below.

BRIEF DESCRIPTION OF THE DRAWINGS

The invention may be understood by reference to the following description taken in conjunction with the accompanying drawings, in which like reference numerals identify like elements, and in which.

Figure 1:
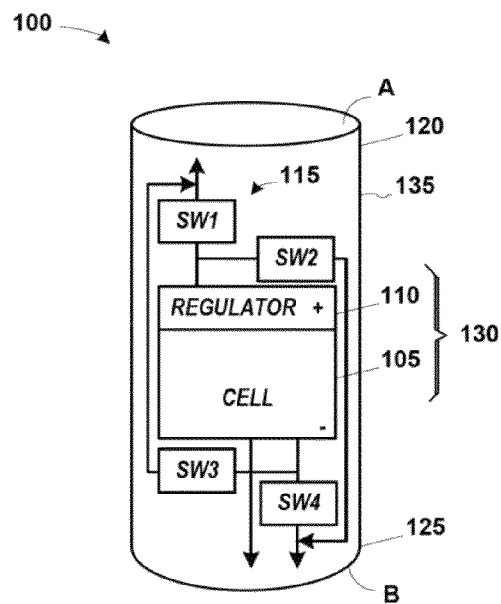
FIG. 1 conceptually illustrates one particular embodiment of a energy storage cell constructed in accordance with the presently disclosed technique.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The presently disclosed technique will now be described with reference to the attached figures. Various structures, systems and devices are schematically depicted in the drawings for purposes of explanation only and so as to not obscure the claimed subject matter with details that are well known to those skilled in the art. Nevertheless, the attached drawings are included to describe and explain illustrative examples of that which is claimed below.

The presently disclosed technique allows a user, such as a soldier, to install the battery cells in any orientation and have the battery cells self-determine the correct contacts for connections to the anode and cathode such that the system operates effectively. It utilizes miniature magnetic sensors and magnets to sense the orientation of the battery in relation to other batteries in the string. The magnetic sensors sense the magnetic field of the adjacent batteries in the string and determine how they are facing relative to the other batteries. Miniature magnets are used to determine which end needs the power output.

FIG. 1 conceptually illustrates one particular embodiment of an energy storage cell 100 constructed and operated in accordance with the presently disclosed technique. As is shown therein, the energy storage cell 100 comprises an energy cell 105, a regulator 110, a plurality of switches SW1-SW4 in a switching circuit 115, and two electrodes A, B at either end 120, 125 thereof. The electrode B in this embodiment is a ground pass-through electrode as discussed further below. The energy cell 105 and regulator 110 may comprise, collectively, a configurable energy cell 130 in this particular embodiment.

The regulator 110 and energy cell 105 are more fully disclosed as the controller and energy cell of U.S. application Ser. No. 13/251,154, ("the '154 application") incorporated by reference below. Much of the functionality set forth in that application is not pertinent to the presently disclosed technique. That part of the functionality that is not pertinent may for that reason be omitted in some embodiments. However, some embodiments may include all that functionality. Modified excerpts of this application will now be presented to provide a fuller explanation within the four corners of this document.

Figure 3A:
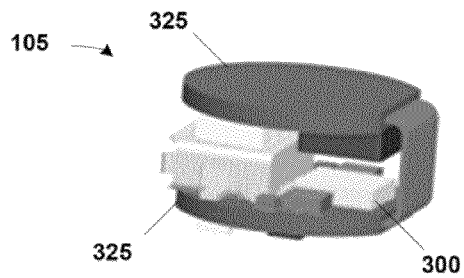
FIG. 3A-FIG. 3C and FIG. 4A-FIG. 4B illustrate one particular embodiment of the regulator of FIG. 1.
Figure 3B:
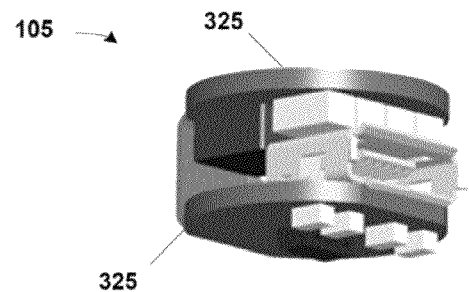
Figure 3C:
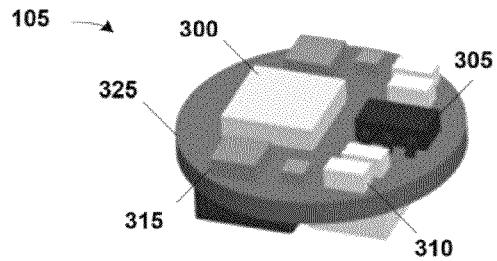
Figure 4A:
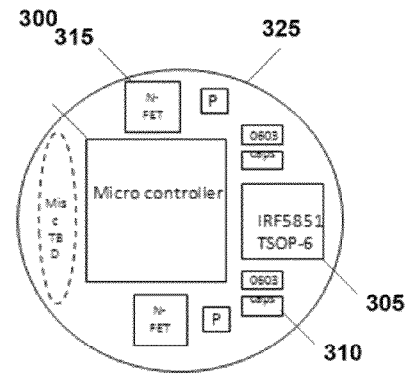
Figure 4B:
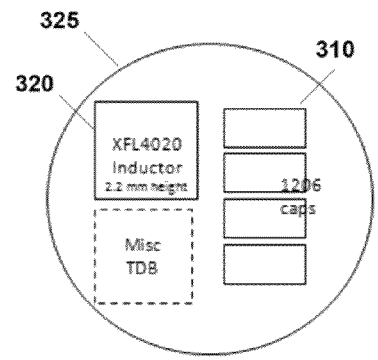

FIG. 3A-FIG. 3C depict the regulator 110 of the energy cell 105 in FIG. 1 in several different views. The regulator 110 includes a plurality of electronics for implementing the functionality described herein. FIG. 4A-FIG. 4B depict the layout of selected electronic components in the controller of the embodiment in FIG. 1. The regulator 110 is built around a processor 300 and a memory 305, but includes other common electronic components such as capacitors 310 (not all indicated), transistors 315 (not all indicated), and an inductor 320. The identity and number of such electronic components will be implementation specific. The processor 300 is, in the illustrated embodiment, a microcontroller. Areas of the board 325 to which these components are mounted are designated "Misc TBD". These areas are not employed in the illustrated embodiment and the designation indicates availability for use should additional components be needed in other embodiments.

Figure 8:
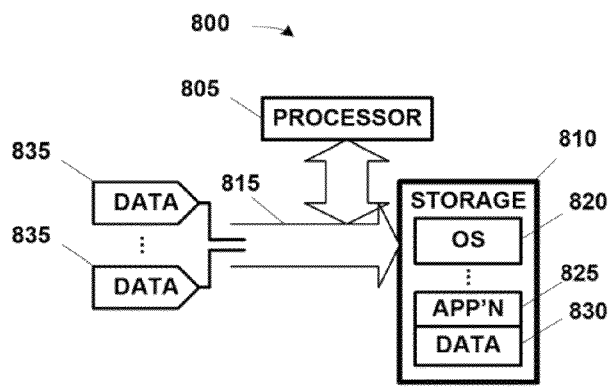
FIG. 8 shows selected portions of the hardware and software architecture of a computing apparatus such as may be employed in some aspects of the present invention.

FIG. 8 shows selected portions of the hardware and software architecture of a computing apparatus such as may be employed in some embodiments of the present invention to implement the regulator 110. The computing apparatus 800 includes a processor 805 communicating with storage 810 over a bus system 815. The storage 810 may include any suitable form of memory, such as random access memory ("RAM") or FLASH memory such as that mentioned above.

While the processor 805 may be any suitable type of processor known to the art, it is highly desirable that such a processor be energy efficient. The tasks consigned to the processor 805 will also be relatively inexpensive in computational terms. Computationally powerful, energy intensive types of processors such as 64-bit general microprocessors, digital signal processors, and processor chip sets will therefore be unlikely candidates for implementing the processor 805 although they certainly may be employed. These types of design constraints mitigate strongly for 8-bit processors, or microcontrollers. The embodiments illustrated herein implement the processor as a microcontroller.

The bus 815 may also be implemented in any suitable way known to the art. However, an objective common to many embodiments will be to standardize the connections between the cell and external devices such a chargers, computers, etc. This objective will mitigate towards busses compatible with various relevant standards. For example, the illustrated embodiments employ micro-USB or USB connectors and so the bus 815 in the illustrated embodiments will, at least in part, be compatible with the micro-USB and USB standards. Energy use constraints may also impact this choice in implementation.

The storage 810 is encoded with an operating system 820, an application 825, and a data structure 830. The processor 805 runs under the control of the operating system 820, which may be practically any operating system known to the art. The application 825 is invoked by the operating system 820 upon power up, reset, or both, depending on the implementation of the operating system 820. The application 825, when invoked, performs the functions consigned to the processor 805. As the data 835 upon which the application 825 operates is received it is buffered or otherwise stored in the data structure 830. The data 835 includes a signal from the sensing circuit as described further below indicating the polarity of an adjacent energy storage cell.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily these quantities take the form of electrical, magnetic, or optical signals capable of being stored, transferred, combined, compared, and otherwise manipulated. it has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on sonic form of program storage medium or implemented over some type of transmission medium. The program storage medium may be magnetic (e.g., a memory chip, a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

However, not all embodiments will necessarily use a programmed processor of some sort. The programming may be embedded in a field gate programmable array ("FGPA"), an applications specific integrated circuit ("ASIC") or some other kind of integrated circuit device. Such embodiments may be more expensive, but they will achieve higher energy efficiencies. They may also realize improvements in space and weight.

Thus, the microcontroller is by way of example but one programmable means for controlling the operating parameters of the energy cell. Alternative embodiments may employ other kinds of processors, or even integrated circuits of various types such as FGPAs and ASICs to implement this functionality. The method of the presently disclosed technique may therefore be implemented in either hardware or software. Still other embodiments may employ other, structurally equivalents performing the recited functionalities.

The programming will be performed in any manner suitable to the art and will be implementation specific. The programming may be performed at the factory and the regulator 110 sealed before shipping. The regulator 110 may be equipped with a connector such as a USB micro-connector through which a use may program it during in the field. Different programming languages may be used. One embodiment, for example uses the well-known JTAG technique to program the regulator 110. Most JTAG vendors provide USB interfaces, but a JTAG/USB adapter may be needed in some cases. Note also that if more pins are needed for programming, connectors other than USB may be used.

Figure 5:
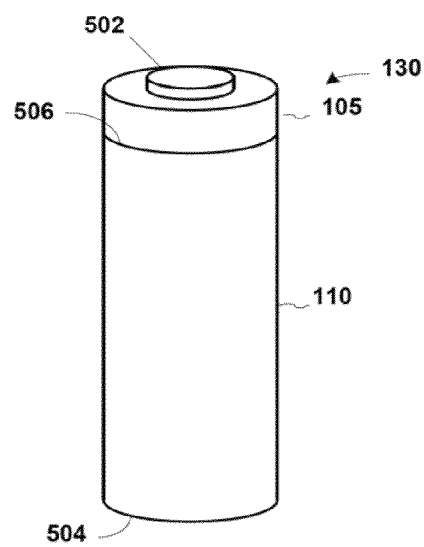
FIG. 5 depicts one particular embodiment of the energy cell of the energy storage cell in FIG. 1.

FIG. 5 depicts one particular embodiment of the configurable energy cell 130. The configurable energy cell 130 employs at least three terminals—a unit cathode 502, a unit anode 504, and a cell cathode 506 for the energy storage cell 130. The unit anode 504 in the illustrated embodiment is also the cell anode. Both the unit anode 504 and unit cathode 502 may be of the style used in AA batteries. However, different embodiments may use other designs. Similarly, the cell cathode 506 may be of any design known to the art. Cell charging and discharging are performed through the unit anode 504 and unit cathode 502.

The cell 110 may be any suitable chemistry known to the art for use in batteries. A list of such chemistries is set forth in Table A below. Note that this table is neither exhaustive nor exclusive.

TABLE A

Contrast Among Chemistries

| Type | Size | Voltage (V) | Capacity (mAh) | Energy (J) | Energy density (W-h/kg) | Peak continuous current (mA) | Peak pulsed current (mA) |
|---|---|---|---|---|---|---|---|
| Alkaline | AA (14.5 mm × 50.5 mm) | 1.5 | 2850 | 15,390 | 178.1 | 1,000-2,000 | N/A |
| NiMH | AA | 1.2 | 1500-2100 | 6,480-9,072 | 66.7-93.3 | ~5000 | 10,000 |
| Li—MnO$_2$ | AA | 3.0 | 2,700 | 29,160 | 385.7 | 1,000 | 2,000 |
| Li—CF$x$ | 1/2 AA | 3.6 | 740 | 9,590 | N/A | N/A | N/A |
| Li—CF$x$ | 80% (modified by vendor) | 3.6 | 1380 | 17,884 | N/A | N/A | N/A |
| Li—CF$x$ | 90% (modified by vendor) | 3.6 | 1590 | 20,606 | N/A | N/A | N/A |
| Li-ion | 80% (modified by vendor) | 3.6 | 520 | 6,740 | N/A | N/A | N/A |
| Li—SO2 | AA | 3.0 | 950 | 10,260 | 356.25 | 500 | 800 |
| LiSO2 | 1/2 AA | 3.0 | 450 | 4,860 | 168.75 | 250 | 400 |

Figure 6:
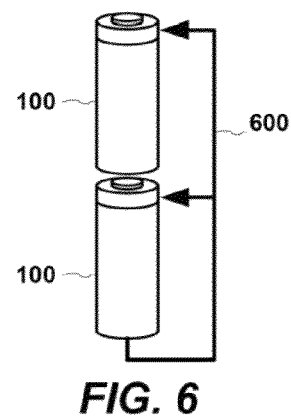
FIG. 6-FIG. 7 illustrates the relationship of two energy storage cells of FIG. 1 deployed in series in one particular embodiment.
Figure 7:
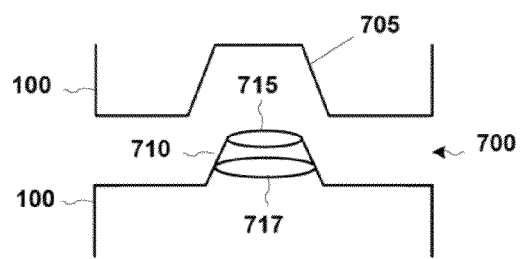

Returning to FIG. 1, the ground pass through electrode B is an implementation specific detail arising from use of the energy cell disclosed in the '154 application. FIG. 6-FIG. 7 illustrates the relationship of two energy storage cells 100 deployed in series. In this particular embodiment, each of the energy storage cells 100 needs to know its internal cell potential relative to that of other cells in order to adjust its output voltage. his, in turn, requires another connection 600, shown in FIG. 6, between the energy storage cells 100 so that a ground reference can be passed among them. The energy storage cells 100 are also self-aligning. FIG. 7 illustrates the abutment of two energy storage cells 100 conceptually illustrating the junction 700 between the cathode 710 and anode 705. That cathode 705 includes a primary electrode 715 and a ground pass-through electrode 717.

Returning to FIG. 1, the switches SW1-SW4 control the polarity of the energy storage cell 100. To make electrode A positive and electrode B negative, switches SW1 and SW3 are closed while switches SW2 and SW4 are opened. Conversely, to make electrode A negative and electrode B positive, switches SW2 and SW4 are closed while switches SW1 and SW3 are opened. The polarity and, hence, the opening and closing of the switches is controlled as a function of the relative orientation of adjacent energy storage cells 100.

Figure 2:
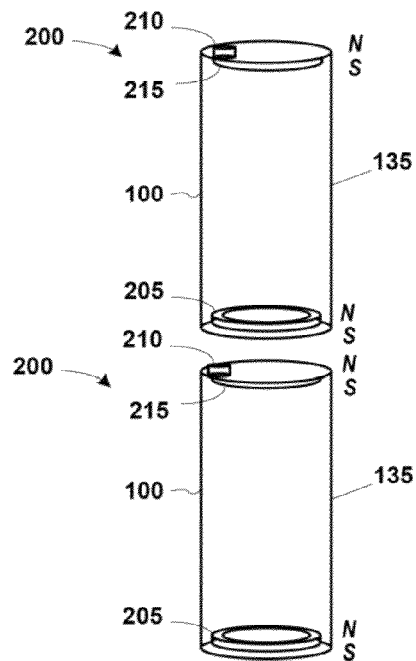
FIG. 2 conceptually illustrates the relationship of two energy storage cells such as the one shown in FIG. 1.

The relative orientation of the energy storage cells 100 is determined by each energy storage cell 100 using a respective sensing circuit 200, shown in FIG. 2. Details of the energy storage cells 100 other than the sensing circuits 200 are omitted from FIG. 2 for the sake of clarity. The sensing circuit 200 comprises a permanent magnet 205 placed in the bottom of the energy storage cell 100 and a reed switch 210 at the top. The illustrated implementation also uses a second permanent 215 magnet placed in the battery enclosure 135 at the top to provide a field by which the energy storage cells 100 can align themselves. Alternative embodiments may reverse these positions. For example, the magnet may be placed at the top of the battery, the reed switch at the bottom, and the magnet in the battery enclosure at the bottom.

In operation, if the reed switch 210 senses the magnetic field, then it knows that the other energy storage cell 100 is referenced in the same direction. The reed switch 210 closes, sends a signal to the voltage regulator 110, and the voltage regulator 110 uses the standard orientation (switches SW2 and SW3 are off, switches SW1 and SW4 on). If the reed switch 210 does not sense a magnetic field, it stays open, thereby sending a signal to the voltage regulator 110, and the voltage regulator 110 switches operate such that the electrical polarization is reversed (switches SW2 and SW3 are on, switches SW1 and SW4 off).

In some embodiments, the switches SW1-SW4 can be the same switches, or similar to those, used for voltage regulation similar to that in the '154 application. In some embodiments, the switches SW1-SW4 can in fact be the same as the switches in the '154 application in the sense that they perform the both the functionality ascribed to them herein as well as the functionality ascribed to those in the '154 application.

Those in the art having the benefit of this disclosure will appreciate that in some embodiments it will be desirable for the overall size of the energy storage cell 100 to be the same as, or at least approximate, that of standard sizes. For example, much of the disclosure in the '154 application is related to the common, standard, AA battery size although dimensions can be changed to accommodate varying implementations. Furthermore, as illustrated and described in the '154 application, multiple batteries may be bundled to emulate other standard sizes with some tradeoffs in in performance.

Furthermore, while the disclosure above is in terms of a battery, those in the art having the benefit of this disclosure will appreciate that there are other types of energy storage cells that may benefit from application of the present technique. For example, one type of energy storage cell known to the art is an electric double-layer capacitor ("EDLC"), also known as a supercapacitor, supercondenser, electrochemical double-layer capacitor, or ultracapacitor. EDLCs may also benefit from application of the presently disclosed technique in the same manner as described above for a battery.

The following patents are hereby incorporated by reference in their entirety and for all purposes as if expressly set forth verbatim herein:

The priority of U.S. Provisional Application 61/558,925 entitled, "In-Situ, Automated Orientation of Energy Storage Cells", filed Nov. 11, 2011, in the name of the inventors Gregory G. Romas, et al., and commonly assigned herewith.

The priority of U.S. Provisional Application 61/559,492 entitled, "In-Situ, Automated Orientation of Energy Storage Cells", filed Nov. 14, 2011, in the name of the inventors Gregory G. Romas, et al., and commonly assigned herewith.

U.S. application Ser. No. 13/251,154, entitled "User Configurable Energy Cell and Interface", filed Sep. 30, 2011, in the name of the inventors Gregory G. Romas et al., and commonly assigned herewith.

In the event of conflict between one or more of the incorporated patents and present disclosure, the present specification, including definitions, controls.

The phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them—i.e., when there is no power or when they are powered but not in operation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An energy storage cell, comprising:
   an energy cell;
   means for sensing the polarity orientation of an adjacent energy storage cell; and
   means for self-orienting the energy storage cell's polarity responsive to the sensed polarity of the adjacent energy storage cell.

2. The energy storage cell of claim 1, wherein the sensing means comprises:
   a permanent magnet dispose at one end of the energy storage cell; and
   a magnetic reed switch disposed at the other end of the energy storage cell.

3. The energy storage cell of claim 2, wherein the sensing means further comprises a second permanent magnet disposed at the other end.

4. The energy storage cell of claim 1, wherein the self-orienting means comprises:
   a regulator; and
   a plurality of switches controlled by the regulator responsive to the sense polarity of the adjacent energy storage cell.

5. The energy storage cell of claim 1, wherein the energy storage cell comprises a battery.

6. An energy storage cell, comprising:
   an energy cell;
   a sensing circuit capable of sensing the polarity orientation of an adjacent energy storage cell; and
   a polarity control circuit capable of self-orienting the polarity responsive to the sensed polarity.

7. The apparatus of claim 6, wherein the sensing means comprises:
   a permanent magnet dispose at one end of the energy storage cell; and a magnetic reed switch disposed at the other end of the energy storage cell.

8. The apparatus of claim 6, wherein the self-orienting means comprises:
 a regulator; and
 a plurality of switches controlled by the regulator responsive to the sense polarity of the adjacent energy storage cell.

9. The apparatus of claim 6, wherein at least one of the energy storage cells comprises a battery.

10. An apparatus comprising:
 a plurality of energy storage cells, each energy storage cell capable of sensing the polarity orientation of at least one other energy storage cell and self-orienting its polarity responsive thereto.

11. The apparatus of claim 10, wherein at least one of the energy storage cells comprises:
 an energy cell;
 means for sensing the polarity orientation of an adjacent energy storage cell; and
 means for self-orienting the energy storage cell's polarity responsive to the sensed polarity of the adjacent energy storage cell.

12. The apparatus of claim 11, wherein the sensing means comprises:
 a permanent magnet dispose at one end of the energy storage cell; and
 a magnetic reed switch disposed at the other end of the energy storage cell.

13. The apparatus of claim 11, wherein the self-orienting means comprises:
 a regulator; and
 a plurality of switches controlled by the regulator responsive to the sense polarity of the adjacent energy storage cell.

14. The apparatus of claim 10, wherein at least one of the energy storage cells comprises:
 an energy cell;
 a sensing circuit capable of sensing the polarity orientation of an adjacent energy storage cell; and
 a polarity control circuit capable of self-orienting the polarity responsive to the sensed polarity.

15. The apparatus of claim 14, wherein the sensing means comprises:
 a permanent magnet dispose at one end of the energy storage cell; and
 a magnetic reed switch disposed at the other end of the energy storage cell.

16. The apparatus of claim 14, wherein the self-orienting means comprises:
 a regulator; and
 a plurality of switches controlled by the regulator responsive to the sense polarity of the adjacent energy storage cell.

17. The apparatus of claim 10, wherein at least one of the energy storage cells comprises a battery.

18. A method for self-orienting a subject energy storage cell, comprising:
 sensing the polarity of an adjacent energy storage cell; and
 setting the polarity of the subject energy storage cell responsive to the sensed polarity if the polarities of the adjacent energy storage cell and the subject energy storage cell are incompatible.

19. The method of claim 18, wherein sensing the polarity of the adjacent energy storage cell includes sensing the presence or absence of a magnetic field emanating therefrom.

20. The method of claim 18, wherein setting the polarity of the subject energy storage cell includes:
 switching the polarity if the magnetic field of the adjacent energy storage cell is sensed; and
 maintaining the polarity if the magnetic field of the adjacent energy storage cell is not sensed.

21. The method of claim 18, wherein sensing the polarity of the adjacent energy storage cell includes setting a reed switch with a magnetic field emanating from the adjacent energy storage cell.

22. The method of claim 18, wherein at least one of the energy storage cells comprises a battery.

\* \* \* \* \*